April 6, 1954 W. M. KELLER ET AL 2,674,208
COVER FOR GONDOLA CARS
Filed Jan. 18, 1952 10 Sheets-Sheet 1
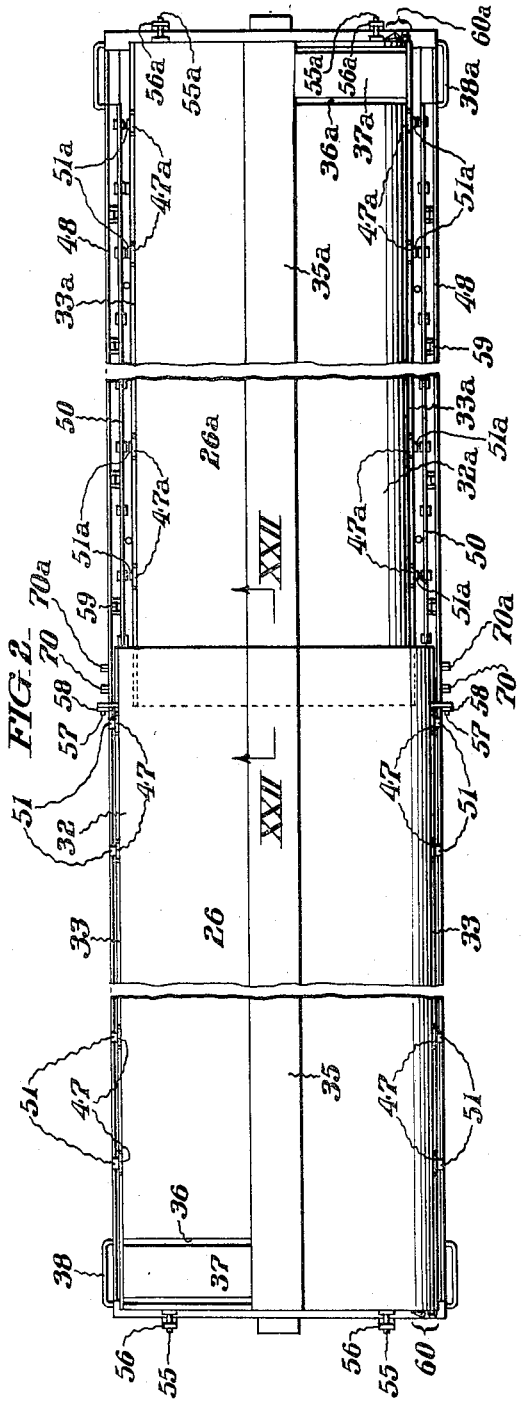
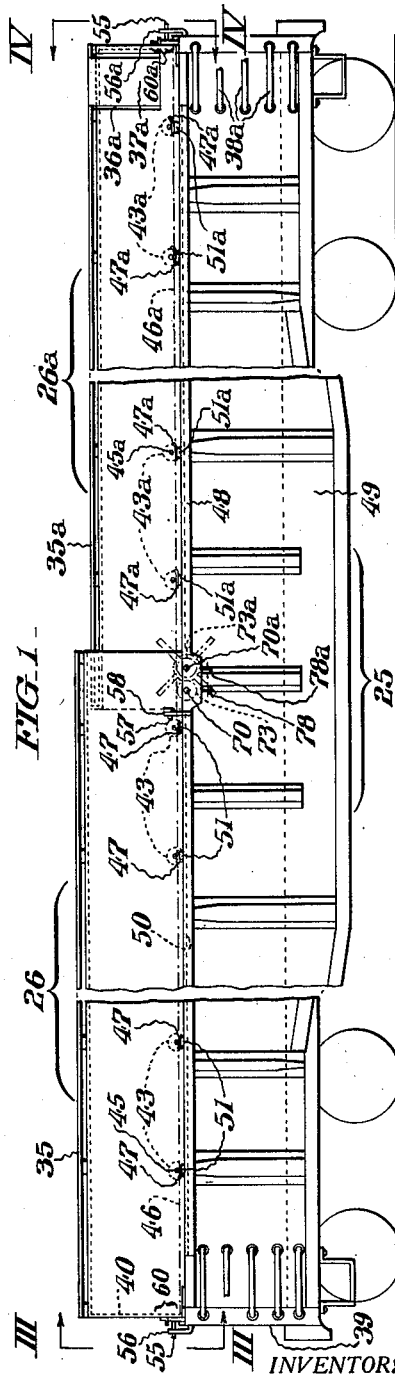
INVENTORS:
William M. Keller &
Lewis M. Showers Jr,
BY
Paul & Paul
ATTORNEYS.

April 6, 1954  W. M. KELLER ET AL  2,674,208
COVER FOR GONDOLA CARS
Filed Jan. 18, 1952  10 Sheets-Sheet 2

INVENTORS:
William M. Keller &
Lewis M. Showers, Jr.
BY Paul & Paul
ATTORNEYS.

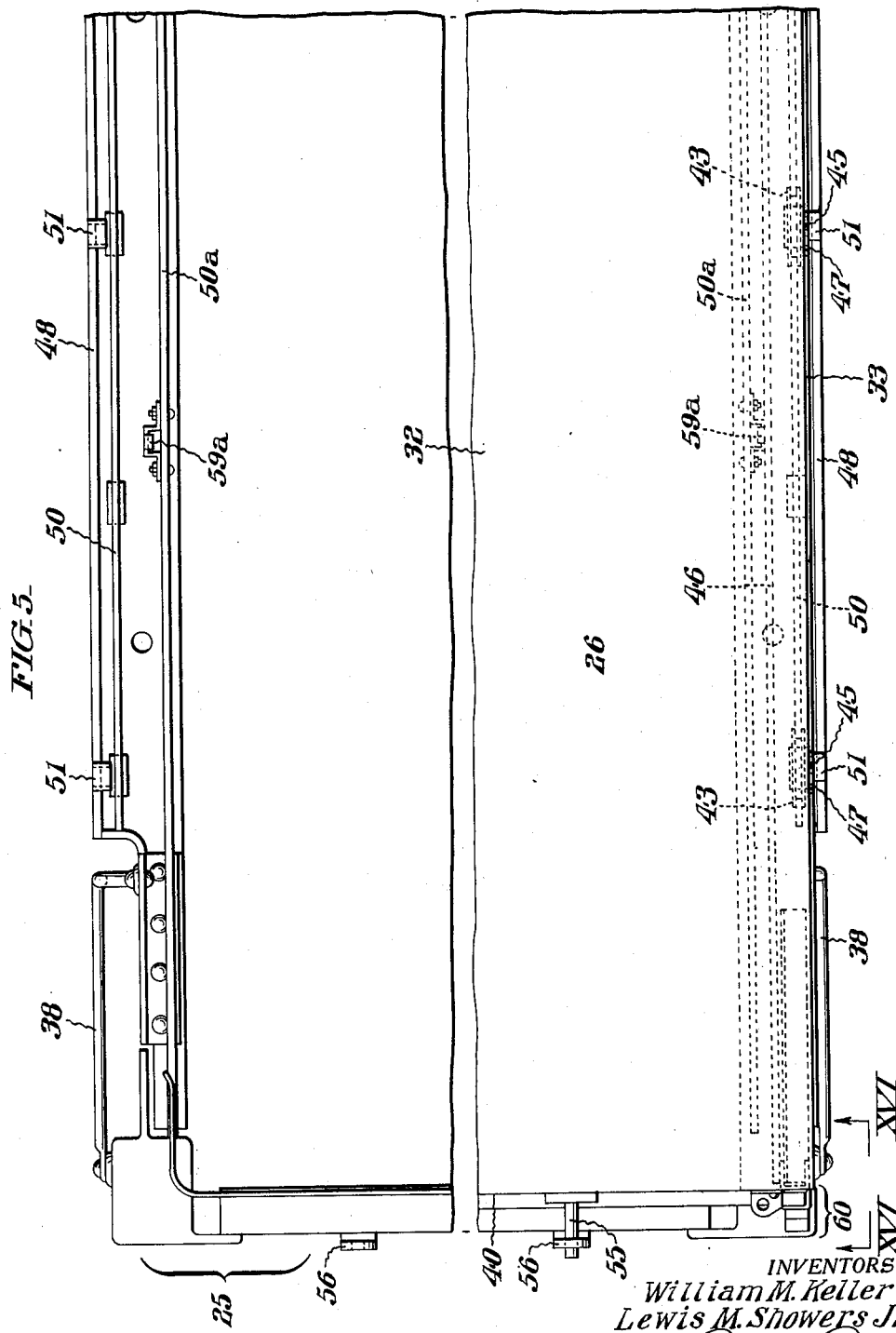

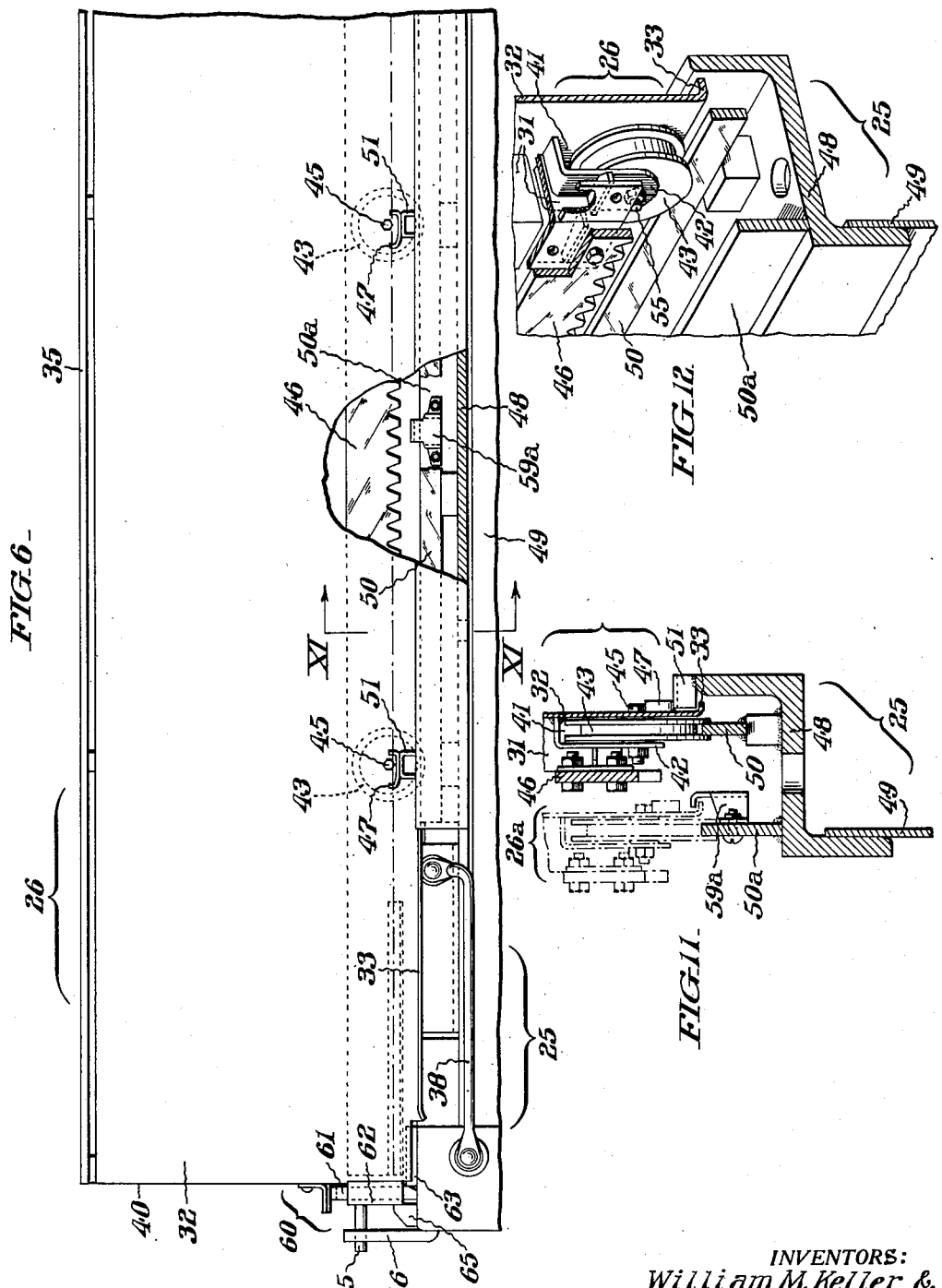

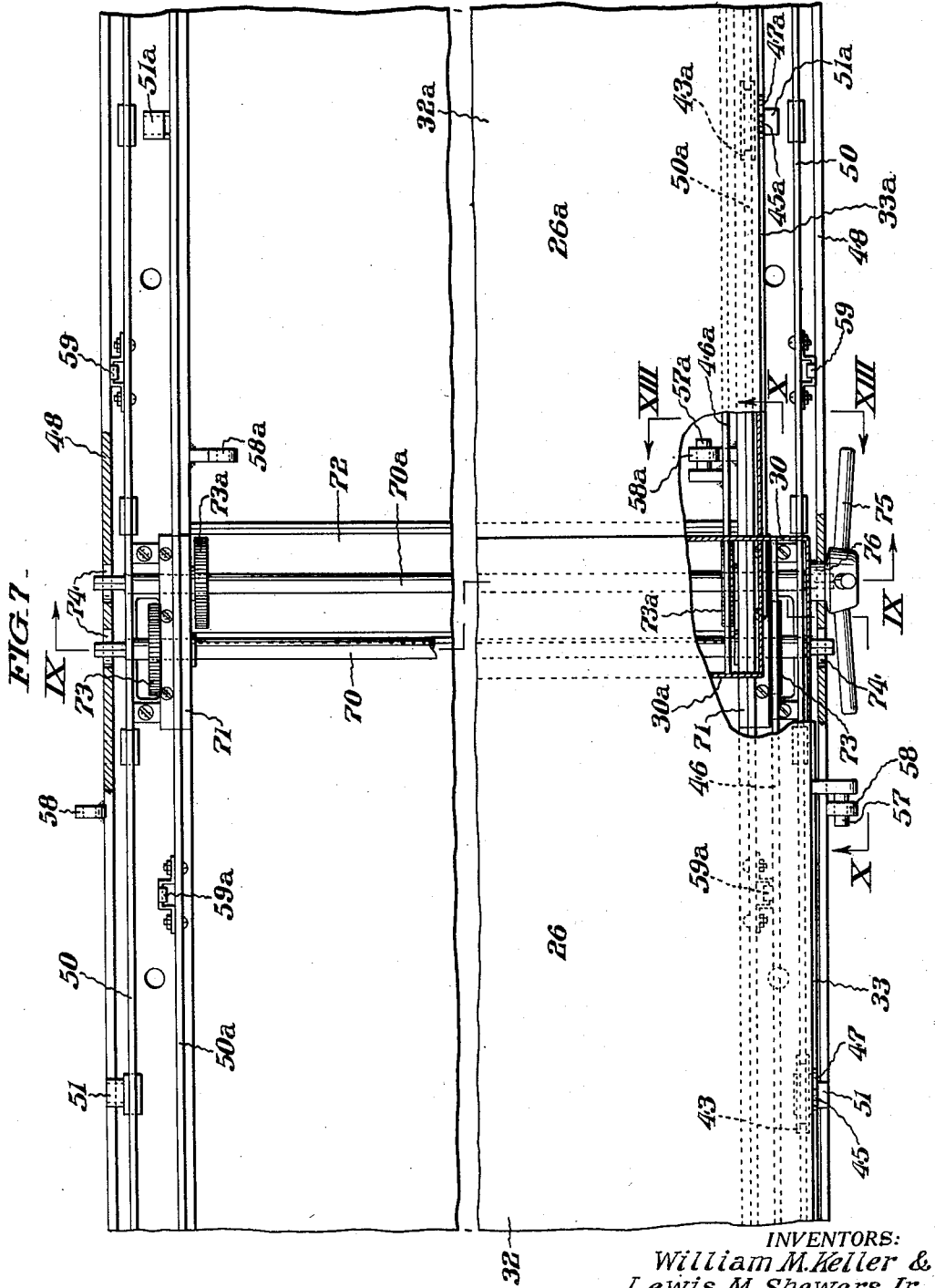

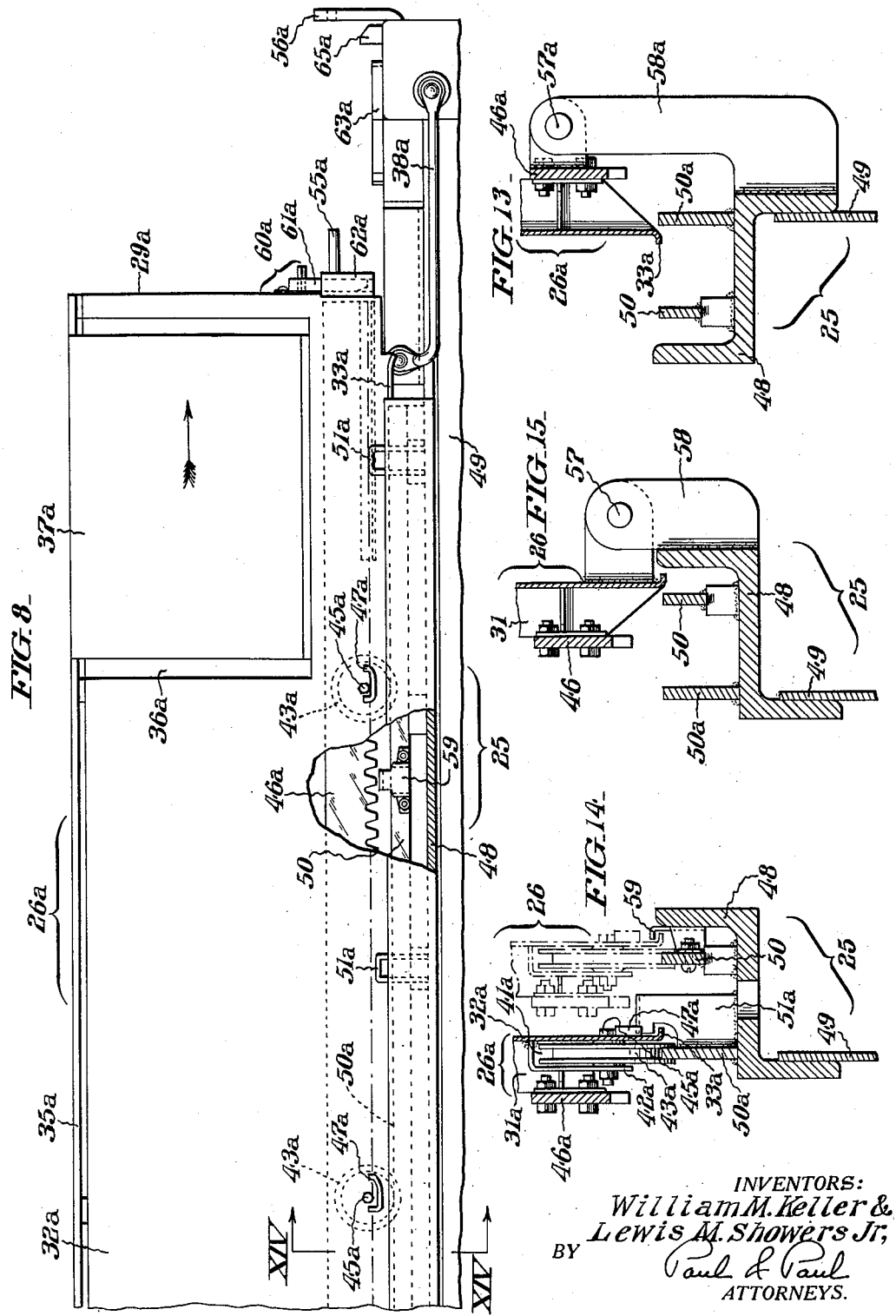

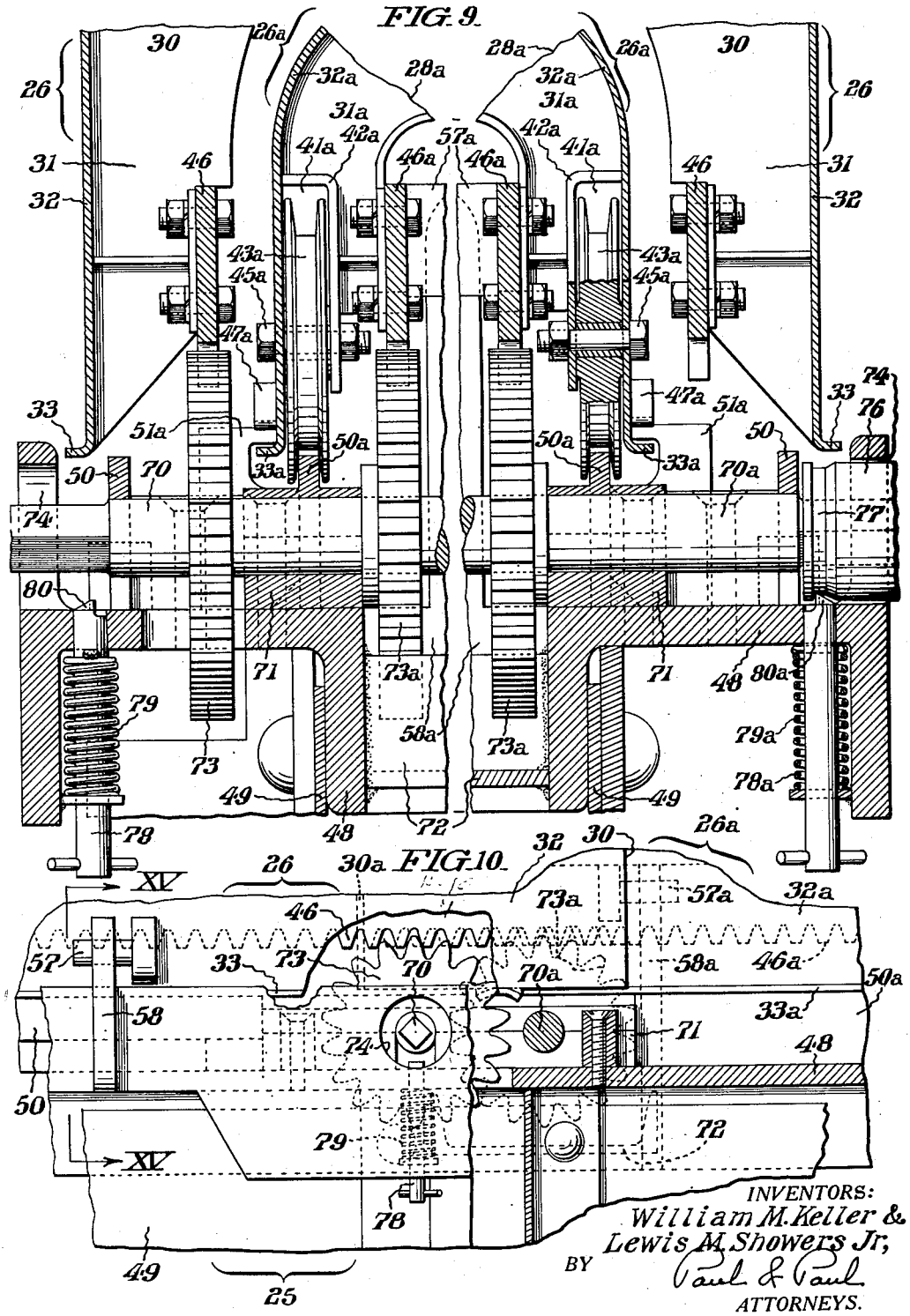

April 6, 1954   W. M. KELLER ET AL   2,674,208
COVER FOR GONDOLA CARS
Filed Jan. 18, 1952   10 Sheets-Sheet 8
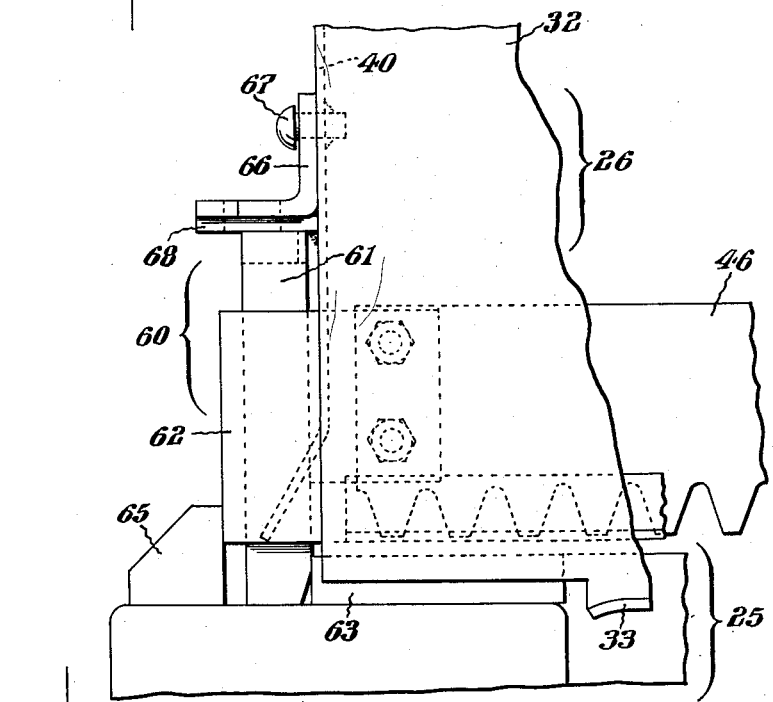
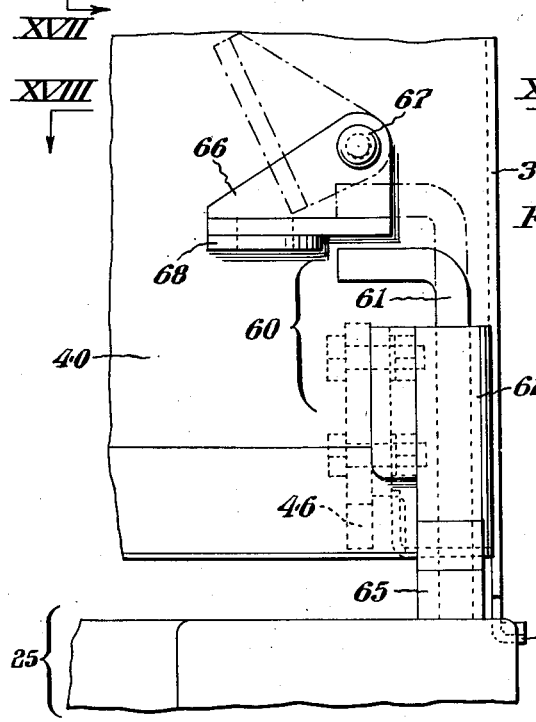
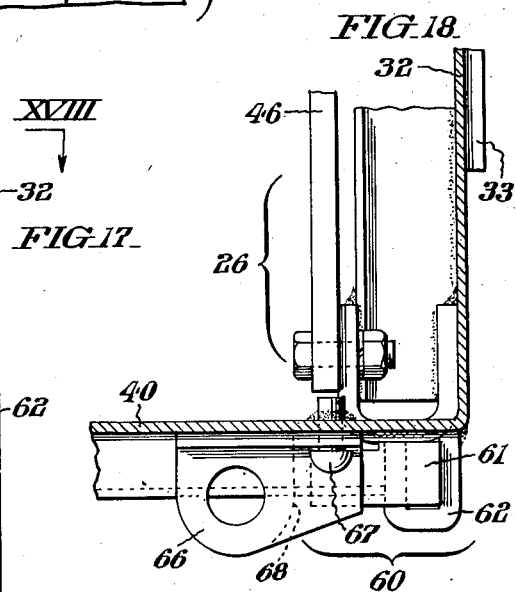
INVENTORS:
William M. Keller &
Lewis M. Showers Jr,
BY
ATTORNEYS.

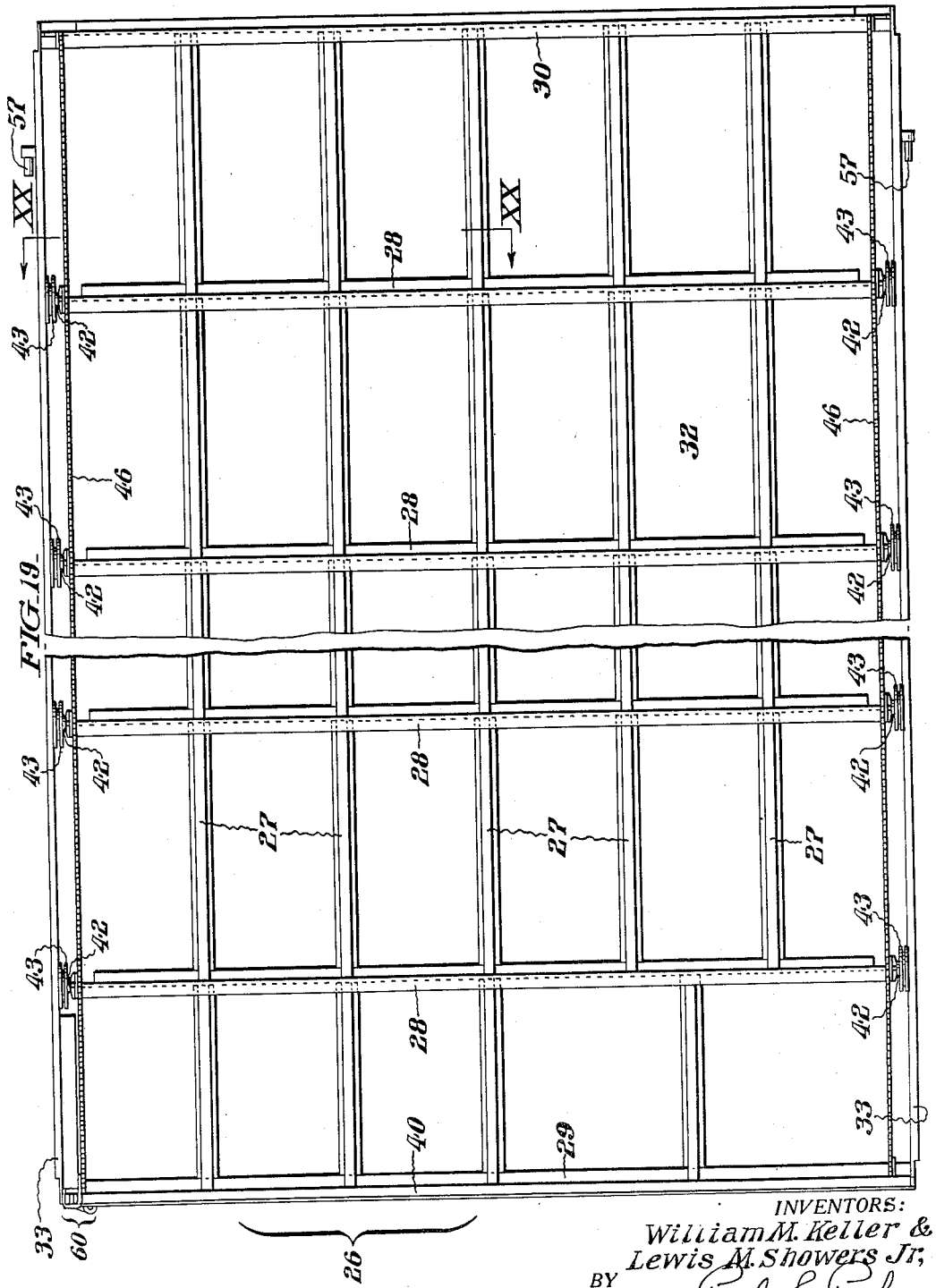

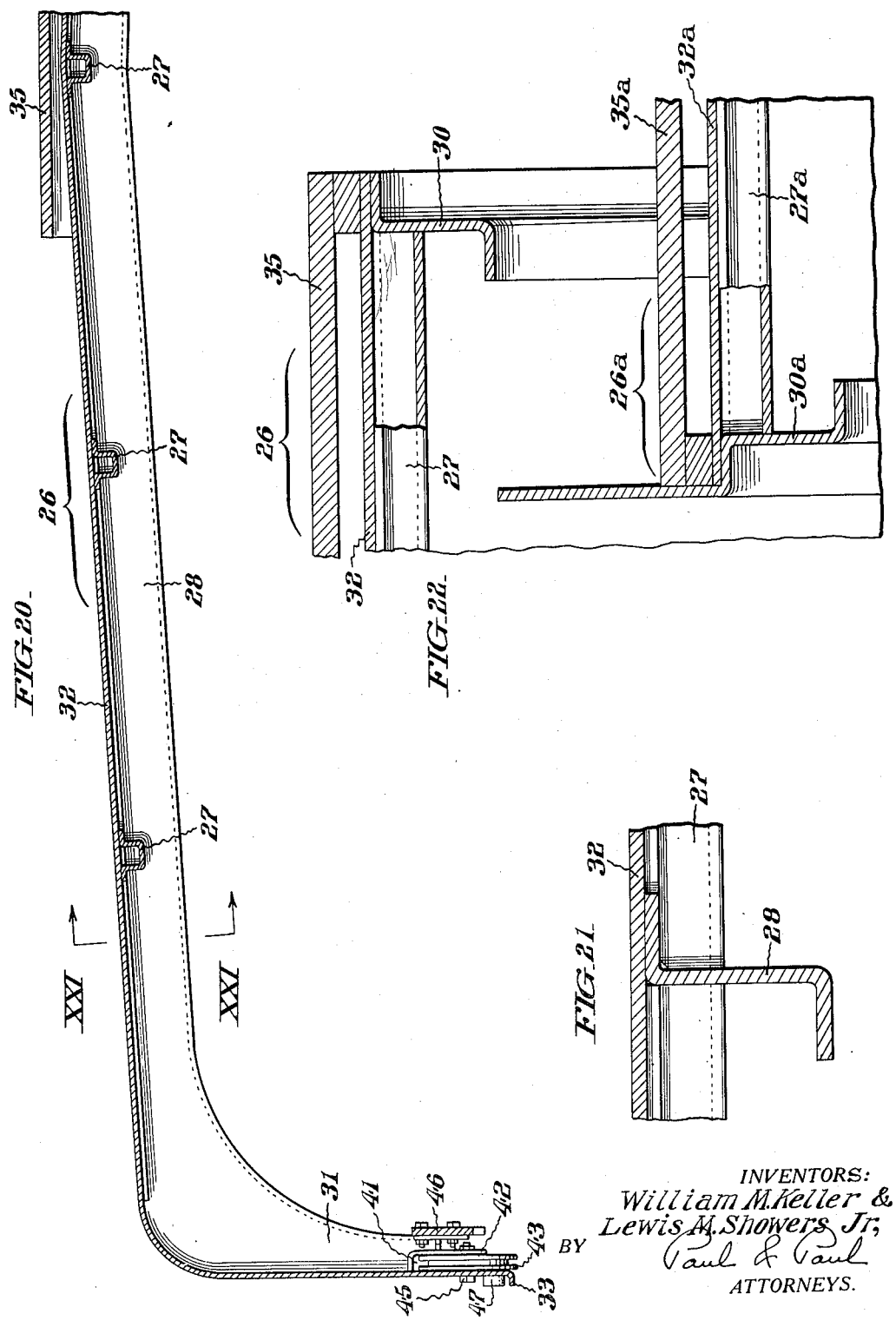

Patented Apr. 6, 1954

2,674,208

UNITED STATES PATENT OFFICE 2,674,208

COVER FOR GONDOLA CARS

William M. Keller, Merion, and Lewis M. Showers, Jr., Lansdowne, Pa., assignors to The Pennsylvania Railroad Company, Philadelphia, Pa., a corporation of Pennsylvania Application January 18, 1952, Serial No. 267,162

7 Claims. (Cl. 105—377)

This invention relates to covers for railway cars of the open or gondola type ordinarily used in the shipment of loose materials such as sand, coal and the like in bulk.

More specifically, our invention is concerned with car covers composed of longitudinal sections capable of being slid one beneath another to permit access to the car interiors for loading and unloading from above.

The chief aim of our invention is to provide a car cover structure of the kind referred to which, although light in weight, is sturdy against deformation incident to rough usage; and which is immune against jamming as between its component sections.

In connection with such a cover structure, it is a further aim of our invention to provide simple means whereby the cover sections can be selectively shifted with expenditure of a minimum of manual effort; improved means for insuring against lifting and rattling of the sections by wind pressure during travel of the car; and equally simple and reliable means for locking the sections against the possibility of shifting through jolting incident coupling of the car with others.

Other objects and attendant advantages will appear from the following detailed description of the attached drawings, wherein:

Fig. 1 is a view, in side elevation, of a gondola car with a sectional cover conveniently embodying our invention.

Fig. 2 is a corresponding view showing the organization in top plan.

Fig. 5 is a fragmentary view likewise drawn to a larger scale and showing the left hand end of the car in top plan with a portion of the corresponding cover section removed.

Fig. 6 is a fragmentary view in side elevation of the part of the structure shown in Fig. 5.

Fig. 7 is a fragmentary broken out view, partly in top plan and partly in horizontal section, of the mid part of the car with portions of the two cover sections removed.

Fig. 8 is a fragmentary view in side elevation of the right hand end of the car and the corresponding cover section taken on line 8—8 of Fig. 7.

Fig. 9 is a broken out fragmentary view in cross section taken as indicated by the angled arrows IX—IX in Fig. 7 and drawn to a larger scale.

Fig. 10 is a fragmentary view, partly in side elevation and partly in longitudinal section, taken as indicated by the angled arrows X—X in Fig. 7.

Fig. 11 is a fragmentary detail view in cross section taken as indicated by the angled arrows XI—XI in Fig. 6.

Fig. 12 is a perspective view corresponding to Fig. 11.

Figs. 13, 14 and 15 are perspective views taken as indicated by the arrows XIII—XIII, XIV—XIV and XV—XV in Figs. 7, 8 and 10 respectively.

Fig. 16 is a fragmentary view in elevation looking as indicated by the angled arrows XVI—XVI in Fig. 5 and drawn to a larger scale.

Fig. 17 is a view in elevation looking as indicated by the angled arrows XVII—XVII in Fig. 16.

Fig. 18 is a fragmentary view in horizontal section taken as indicated by the angled arrows XVIII—XVIII in Fig. 17.

Fig. 19 is a broken out view showing the invert plan of one of the cover sections.

Fig. 20 is a fragmentary view in cross section taken as indicated by the angled arrows XX—XX in Fig. 19.

Fig. 21 is a fragmentary detail section taken as indicated by the angled arrows XXI—XXI in Fig. 20; and Fig. 22 is a fragmentary view in longitudinal section at the region of overlap between the cover sections, taken as indicated by the angled arrows XXII—XXII in Fig. 2.

Figure 3:
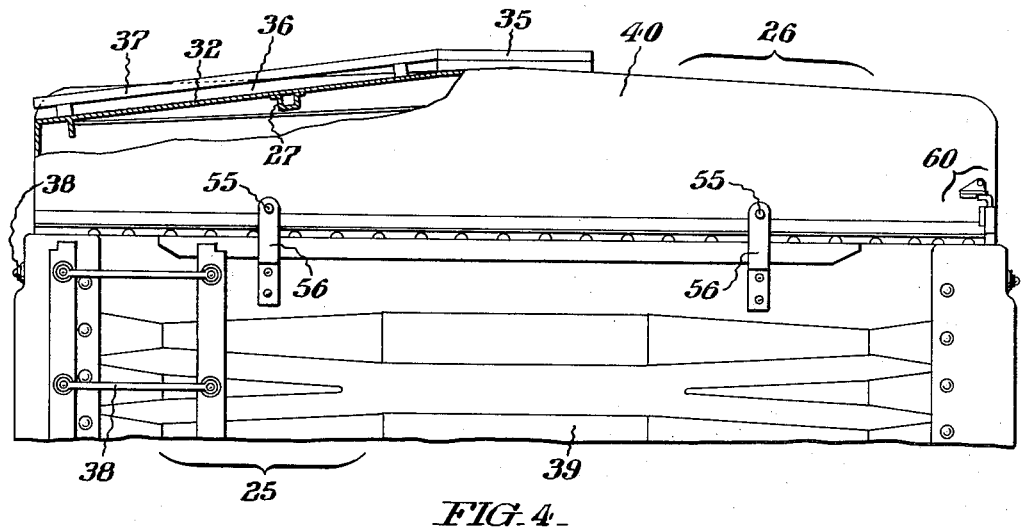
Figs. 3 and 4 are fragmentary views, in elevation, of opposite ends of the car looking as indicated by the angled arrows III—III and IV—IV respectively in Fig. 1 and drawn to larger scale.
Figure 4:
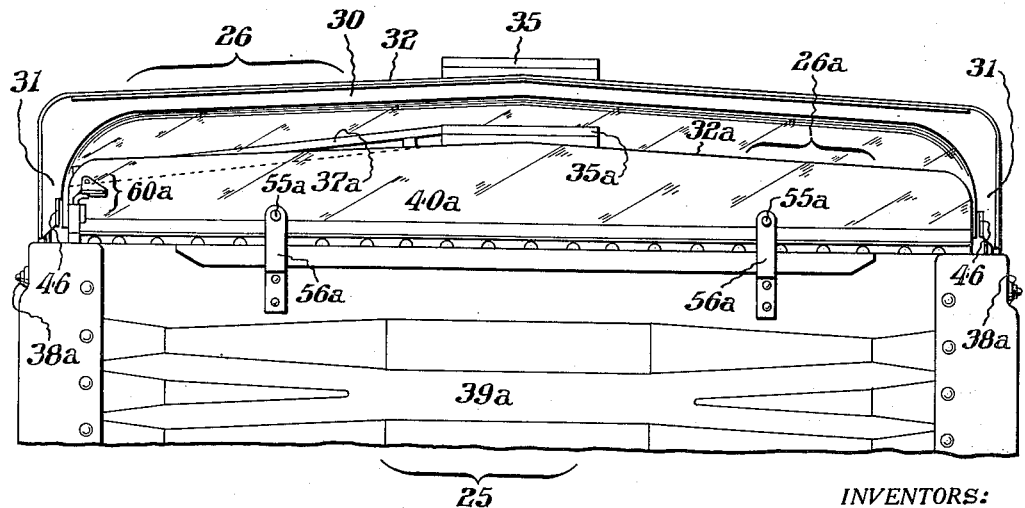

With more detailed reference first to Figs. 1–4 of these illustrations, the car generally designated by the numeral 25 will be observed as being of the open top gondola type ordinarily used in the rail shipment of loose materials such as coal, crushed stone, sand and the like.

The cover structure, with which the present invention is more especially concerned, comprises the two independently slidable telescoping transversely-arched hood-like sections respectively designated 26 and 26a. When these cover sections are in closed position, their inner ends over-lap by a substantial extent midway of the length of the car as shown in Figs. 1 and 2. When access is to be had to the left hand end portion of the car, the outer cover section 26 is shifted to the right over the inner cover section 26a; and when access is desired to the right hand end portion of the car, said inner cover section 26a is shifted to the left beneath the outer cover section 26.

Cover section 26 is separately illustrated in Figs. 19-21 and, as shown, comprises a skeleton frame which is composed of transversely-spaced U section lengthwise members or purlines 27 and longitudinally spaced intermediate and end Z section cross members or ribs 28, and 29, 30, these parts being rigidly united at the regions of intersection as by welding. The ribs 28—30 are sloped slightly from the longitudinal median of the car toward the sides of the car as instanced in Fig. 20, and their ends are directed vertically downward as at 31. To this skeleton structure is welded or otherwise rigidly secured a roof sheeting 32 which extends downward of the vertical side portions 31 of the ribs 28—30 and which is flanged outwardly at the bottom as at 33. Extending over the longitudinal median or ridge line of cover section 26 is a weld-integrated cat walk 35, see Fig. 1; and similarly affixed within a recess 36 in the roof sheeting 32 at the left hand or distal end of said section is a lateral spur 37 which aligns with the approach ladder 38 (Fig. 2) at one end of the car when said cover section is in closed position. The wall 40 (Fig. 3) at the distal end of cover section 26 extends down into close proximity to the corresponding end wall 39 of the car 25. At the bottoms of the vertical side portions of the intermediate ribs 28, the transverse flanges 31 are cut away instanced as at 41 in Figs. 20, and welded within these cut outs are plates 42 which, in conjunction with the pendant side portions of the roof sheeting 32, form yokes for occupation by grooved rollers 43 free to revolve about the shanks of headed axis bolts 45 passed transversely through said plate and said sheeting. Bolted to the inner flanges of the pendent portions of the ribs 28—30 at the bottom are toothed rack bars 46, the purpose of which will be presently explained as will also the function of shoe elements 47 welded fast to the sheeting 32 exteriorly of opposite sides of the cover section 26 in the region of the rollers 43.

Welded to the tops of the outwardly extending lateral flanges of Z section bars 48 at the tops of the side walls 49 of the car are longitudinally arranged upstanding track rails 50 which are engaged with a close fit by the grooved rollers 43 on cover section 26. Similarly affixed to the tops of the upstanding flanges of the Z bars 48 are lugs 51 which are spaced by a distance equal to the spacing of the shoes 47 on cover section 26 for capacity to cooperate with said shoes in lifting said cover section slightly as the latter is shifted leftward and nears its closed position, as will be readily understood from Fig. 6. Notwithstanding clearance of their treads from the rails 50, rollers 43 will still be held snugly to said rails by their flanges as shown in Fig. 11. It is to be noted from Fig. 11 that the lugs 51 overhang the outward flanges 33 at the bottoms of the side portions of the roof sheeting 32 and prevent the cover section from being further lifted. As an additional means to prevent accidental upward displacement of the cover section by wind pressure or jarring during travel of the car, we have provided the latter at its outer closed end with studs 55 which are adapted to engage into apertured projections 56 upstanding from the corresponding ends of the car, and also with similar studs 57 on the opposite side portions of the hood adjacent to front end of the latter to engage with apertured lugs 58 affixed to the sides of the car.

When cover section 26 is shifted rightward to full open position, lifting thereof will be prevented by auxiliary hold down lugs 59, see Figs. 1, 7, 8 and 14 which are bolted fast to the outer sides of the rails 50 and which have lateral projections overreaching the bottom side edge flanges 33 of said cover section.

Hood 26 is locked in closed position by a latch means 60 shown in Figs. 1-8, and 19 and illustrated in detail in Figs. 16-18. As shown, this latch means 60 comprises a bolt 61 which is vertically slidable in a guide 62 affixed to the outer or closed end of the hood, and which is adapted to engage in behind stop block 63 affixed to the top of the corresponding end wall of car 25, the outward movement of the hood being limited by engagement with the bolt guide with a stop block 65 also affixed to the top of the end wall of the car. A retractable keeper 66 pivoted at 67 to the outer wall end of hood 26 normally overhangs the lateral manipulating projection at the top of bolt 61 as shown in full lines in Fig. 17 to prevent the latter from rising through jolting of the car during travel. The bolt 61 is cleared for retraction by swinging keeper 66 upward from the stop lug 68 on hood to the broken line position at Fig. 17. Keeper 66 and lug 68 may be apertured as shown, for application of a padlock to preclude unauthorized operation of cover section 26.

The means provided for moving the hood section 26 to open or closed positions includes a transverse shaft 70 which is rotatively supported in fixed bearings 71 on the Z bars 48 along the top of the side walls of car 25 medially of the length of the latter. At this region, the side walls of car 25 are braced by a crosswise general beam 72. Fixed on shaft 70 are spur wheels 73 which mesh with the longitudinally extending toothed racks 46 on cover section 26. The opposite ends of shaft 70 are squared as shown and are accessible through openings 74 in the upstanding flanges of Z bars 48 for selective application thereto of an actuating hand wheel such as the one indicated at 75 in Figs. 8 and 9. The hub 76 of hand wheel 75 is circumferentially grooved as at 77 for retention of the wheel, by keeper bolts 78 as shaft 70 is turned. Each keeper bolt 78 is retractable against the pressure of a spring 79 and the top end thereof is beveled as at 80. Accordingly, as wheel 75 is applied to shaft 70, the bolt 78 is ultimately depressed against the pressure of its spring 79 by camming action of the wheel hub with the bevel at the top of said bolt in a manner which will be readily understood from Fig. 9. From the latter figure, it will be also readily understood that the hand wheel can be readily withdrawn upon retraction of bolt 78.

Except as hereinafter particularly pointed out and except for being of somewhat smaller dimensions vertically and transversely, the inner cover section 26a is identical in construction to that of the outer cover section 26, and associated with it are similar facilities for holding it down and locking it in closed position, as well as for shifting it back and forth to closed or open position. This being so, all corresponding elements of cover section 26a and the facilities associated with it having their counterparts in the cover section 26 are identified by the same reference numerals previously employed with addition in each instance of the letter "a" for convenience of more readily distinction. It is to be noted that the operating shaft 70a for the inner cover section 26a is journaled in the bearings 71 midway of the length of car 25 immediately adjacent the operating shaft 70 for the outer cover section 26 as shown in Figs. 1, 2, 7, 9 and 10, and its ends are squared for selective application of hand wheel 75 which can thus be used for either shaft from either side of the car. Note in Fig. 22, that the upstanding flange of the end rib 30a of cover section 26a extends to a height at the level of the bottom flange of the corresponding end rib 30 of section 26 to prevent entry into the car when the two sections are in closed position and locked.

From the foregoing, it will be seen that our cover was designed with relatively flexible car lines arched sufficiently so as to allow the rollers to breathe laterally for capacity to conform to irregularities in track parallelism as the sections are rolled along the track. The rigidity of the car lines is greatly increased over their normal free support rigidity by the restraining action of the close fitting flanged rollers in contact with the track.

Having thus described our invention we claim:

1. A cover construction for open top railway cars or the like comprising two independently shiftable telescoping sections respectively of somewhat more than half car length to overlap slightly when in closed position; flanged rollers at intervals lengthwise of opposite sides of the respective cover sections; laterally spaced guide rails longitudinally of opposite sides of the car for engagement by the rollers on the respective cover sections; friction pads with inclined approaches mounted on the cover sections in the regions of the respective rollers; and friction lugs affixed to the sides of the car spaced to correspond with the spacing of the rollers on the cover sections and adapted to be engaged from above by the shoes to lift said sections slightly as they approach closed position.

2. The invention according to claim 1, wherein the respective cover sections are transversely arched and of sheet metal with the longitudinal edges of the metal outwardly flanged; and further including fixed lugs at intervals lengthwise of the tops of the side walls of the cars with projections over-reaching the side flanges of the respective cover sections to prevent the rollers from leaving the rails as said sections are shifted from closed to open position and vice versa.

3. The invention according to claim 1, wherein the respective cover sections are of sheet metal transversely arched and closed at the distal ends by walls of sheet metal; wherein fixed upstanding apertured projections are arranged along the tops of the side walls and the end walls of the car; and wherein horizontally arranged studs affixed to the sides and the end walls of the respective cover sections enter the apertures of the aforesaid projections as said sections are moved to closed position.

4. The invention according to claim 1, further including latch bolts constrained to up and down movement by guides at the distal ends of the respective cover sections, stops at opposite ends of the car behind which the latch bolts are adapted to engage when the cover sections are in closed position; and retractable keepers on the distal ends of the cover sections to prevent rise of the latch bolts in locked position.

5. A cover construction for open top railway cars or the like comprising two independently shiftable telescoping sections respectively of somewhat more than half car length to overlap somewhat when in closed position; and actuating means including toothed racks affixed along opposite sides of the respective cover sections; a pair of closely spaced crosswise shafts journalled in fixed bearings medially of the length of the car in the region of overlap of the cover sections, spur wheels on the shafts in mesh with the racks on the respective cover sections; and operating means for individually turning the shafts.

6. The invention according to claim 5, wherein the ends of the two shafts are squared and wherein the operating means is in the form of a hand wheel capable of application selectively to the squared ends of said shafts.

7. The invention according to claim 5, wherein the ends of the two shafts are squared, and wherein the operating means is in the form of a hand wheel capable of application selectively to the squared ends of said shafts, and further including a retractable spring-biased bolt on the car in the region of each shaft for engaging into a circumferential groove in the hub of the hand wheel to hold the wheel in place on the shaft end.

References Cited in the file of this patent

UNITED STATES PATENTS

| Number | Name | Date |
| --- | --- | --- |
| 2,201,737 | Meyer et al. | May 21, 1940 |
| 2,269,630 | Marinello | Jan. 13, 1942 |
| 2,269,631 | Marinello | Jan. 13, 1942 |